United States Patent [19]
Miller

[11] Patent Number: 6,158,284
[45] Date of Patent: Dec. 12, 2000

[54] METHOD AND APPARATUS FOR GEOGRID MEASUREMENT

[75] Inventor: Scott A. Miller, Little Rock, Ark.

[73] Assignee: Verigrid Inc., Carthage, Tex.

[21] Appl. No.: 09/022,068

[22] Filed: Feb. 11, 1998

[51] Int. Cl.[7] ..................................................... G01H 5/00
[52] U.S. Cl. ............................................... 73/597; 73/627
[58] Field of Search .............................. 73/597, 598, 627, 73/628, 629, 660; 376/252; 976/DIG. 231; 340/675, 677

[56] References Cited

U.S. PATENT DOCUMENTS

| | | | |
|---|---|---|---|
| 4,449,098 | 5/1984 | Nakamura et al. | 324/326 |
| 4,597,183 | 7/1986 | Broding | 33/125 |
| 4,767,237 | 8/1988 | Casman et al. | 405/157 |
| 4,852,263 | 8/1989 | Kerr | 33/133 |
| 4,892,701 | 1/1990 | Mauvieux | 73/628 |
| 5,096,335 | 3/1992 | Anderson et al. | 405/288 |
| 5,115,672 | 5/1992 | McShane | 73/596 |
| 5,118,463 | 6/1992 | Bordy | 73/600 |
| 5,214,616 | 5/1993 | Terhune | 73/634 |
| 5,267,816 | 12/1993 | Mercer et al. | 405/258 |
| 5,540,525 | 7/1996 | Miller | 405/284 |
| 5,632,571 | 5/1997 | Mattox | 405/19 |

*Primary Examiner*—Helen C. Kwok
*Attorney, Agent, or Firm*—Stephen D. Carver

[57] ABSTRACT

Methods and apparatus enabling the length of a reinforcing geogrid for earthen structures to be determined even when the geogrid is buried. The preferred geogrid body comprises a plurality of spaced apart, elongated spans that are regularly intersected by similar, elongated, transverse spans. Voids defined between intersecting body spans facilitate the attachment of the geogrid to retaining walls, or other wall or earthen structures. A test line, preferably an electrically conducive wire, is molded into the geogrid body. The length of this conductor is electrically calculated and displayed to determine the length of the buried geogrid. Preferably an electrical pulse is generated and applied to the geogrid and a return echo is thereafter detected. The time difference between the pulse application and the return echo is electrically sampled and correlated to the conductor length. In alternative embodiments either sonic or light energy is applied to the test line for measurements. Thus it can be determined if the installed geogrid is in compliance with architectural plans, drawings or the like.

18 Claims, 5 Drawing Sheets

METHOD AND APPARATUS FOR GEOGRID MEASUREMENT

BACKGROUND OF THE INVENTION

I. Field of the Invention

The present invention relates generally to earthen formations and to related structures for soil reinforced retaining walls. More particularly, the present invention relates to geogrids and walls reinforced with geogrids of the type classified in United States Patent Class 405, Subclasses 258, 262, and 284.

II. Description of the Prior Art

Plastic reinforcement grid systems are used extensively in the construction of soil reinforced, segmental block retaining walls and reinforced slopes. So-called geogrids are available in a variety of sizes and configurations. The generally planar, sheet-like material typically comprises bidirectional, reinforcement grids. Typically the web-like material is installed adjacent layered block walls, with portions of the geogrid captivated by abutting blocks. Tensile strength is exhibited in both primary and secondary directions. Geogrid use has increased significantly over the last twenty years. Various building codes, regulations, and design standards now mandate the inclusion of reinforcing grids when retaining walls are built, or when slopes are reinforced. Geogrid use will likely increase in the future.

Geogrids are typically manufactured from high tenacity, plastic or polyester yarns. The grids may be woven, knitted, drawn, or extruded and then coated with a protective material. The coating material typically comprises high density polyethylene or polyvinyl chloride. Geogrids form an interlocking pattern with a plurality of regularly spaced apart voids. The grids are distributed upon and dispensed from large rolls. Preferred geogrid structures are stable, and resist creeping and deformation. Proper design and use minimizes installation damage, overstress, and elongation. In addition, the grid structure must resist chemical and biological degradation. Typical grids must be pliable for installation. They should be resistant to temperature and moisture extremes, soil chemicals and ultraviolet exposure. The so-called "Long Term Design Strength" for by modern geogrids provides a safe and efficient means of erecting safe and stable, soil-reinforced structures.

U.S. Pat. Nos. 5,267,816, 5,632,571 and 5,096,335 show plastic geogrids used for construction reinforcement.

U.S. Pat. No. 5,540,525 shows a modular block retaining wall system that may employ reinforcing geogrids. The modular blocks stack together to form a wall, and interconnect with portions of the geogrid reinforcing web.

U.S. Pat. No. 4,856,939 depicts a system employing wire trays to strengthen a geogrid reinforcement.

U.S. Pat. Nos. 4,767,237, 4,449,098, 4,597,183, and 4,852,263 show various systems for measuring the length of linear elements.

Once a geogrid structure is buried in the ground behind a segmental block wall or in a reinforced slope, the installed length is very difficult to determine through conventional means. Obviously, once the geogrid is buried in the ground, only small edge portions are visible to the human eye. Geogrid length is one of the most significant design parameters related to the strength of segmental block walls and reinforced slopes. In walls, the length of the geogrid is directly related to critical factors such as wall sliding, overturning, bearing capacity and global stability. The length of the geogrid in reinforced earth structures is related to the steepness and stability of the slope.

On infrequent occasions when reinforced segmental block retaining walls or reinforced slopes fail, it is imperative that geogrid length be ascertained to assess the stability of the remainder of the wall or slope. In addition, verification of geogrid lengths after construction and before final acceptance by the owner or Architect/Engineer is useful to verify that the wall or slope has been constructed in accordance with the specified design. At the present time, most reinforced slopes and retaining walls are constructed without adequate inspection by the owner, or the Architect/Engineer.

Thus an efficient means of geogrid length determination in conjunction with reinforced slopes and segmental block walls would be a useful and cost effective method of design verification after construction. Such a system would be an invaluable tool for forensic investigation. Moreover, an efficient system for geogrid length measurement would make it easier to verify contractor compliance with soil-reinforced structure specifications.

SUMMARY OF THE INVENTION

I have designed a system and geogrids employed by the system wherein geogrid length may be electrically, sonically or optically determined even when the geogrid is buried.

The preferred geogrid body comprises a plurality of spaced apart, elongated spans that are regularly intersected by similar, elongated, transverse spans. Voids defined between intersecting filamentary spans aid in attaching the geogrid to wall block structures and the like. The voids also help lock the geogrid into the soil.

Preferably an electrically conductive wire is molded into a predetermined number of spans at regular intervals. The length of this conductor may be electrically determined. When the length is so calculated, the length of the buried geogrid is thus found.

The preferred method and apparatus I have invented applies a pulse to the geogrid. A return echo is thereafter detected. The time difference between the pulse application and echo detection is electrically sampled and correlated to the conductor length. In alternative embodiments fiber-optic and sonic conductor arrangements may be employed.

Thus a basic object of my invention is to provide a geogrid whose length can be effectively measured after burying.

Another fundamental object is to provide an inspection system for measuring geogrid length.

A related object is to provide a geogrid system for quickly verifying compliance with design specifications.

A basic object is to provide a hand-held instrument for measuring the length of installed geogrids.

Another fundamental object is to provide an efficient method and apparatus for measuring geogrids in situ without digging or excavating.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
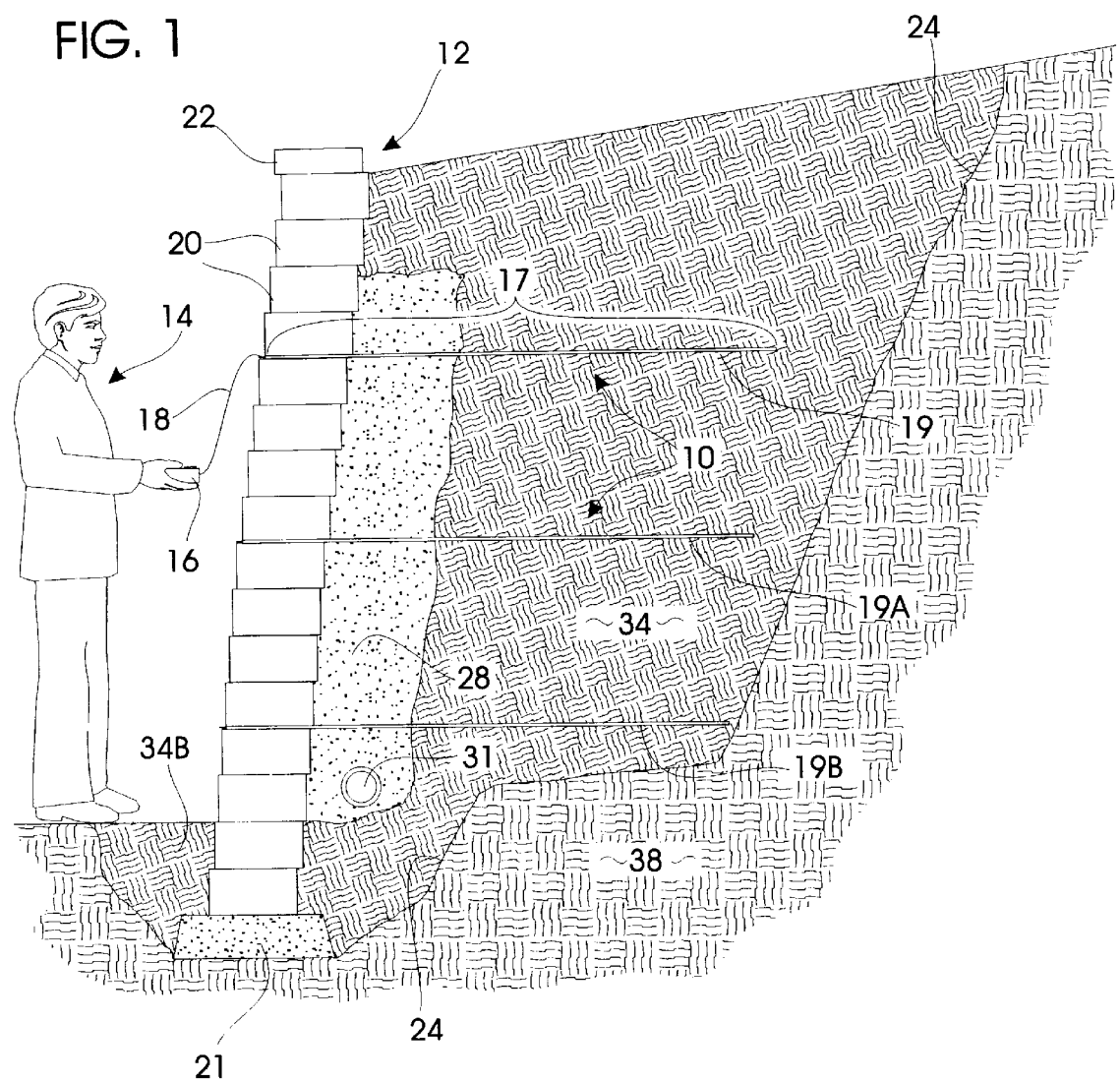
FIG. 1 is a fragmentary sectional view of a modular concrete block, reinforced retaining wall equipped with my new geogrid system.

With initial reference now directed to FIG. 1 of the appended drawings, my new geogrid has been generally designated by the reference numeral 10. A representative retaining wall 12 has been reinforced by proper implementation of my concept. My hand-held control unit 16 enables an inspector 14 to determine the installed length 17 of a typical geogrid segment 19. As will be described in detail hereinafter, the control unit 16 communicates with an appropriate conductor or structure within geogrid segment 19 through a probe lead 18 of known length. In effect, the control unit 16 samples length-related characteristics of the modified geogrid for measurement of geogrid length.

As will be recognized by those skilled in the art, a typical retaining wall 12 (FIG. 1) comprises multiple layers of interlocking concrete blocks 20 that may be pinned together for alignment purposes. The wall rests upon a subterranean granular leveling pad 21 constructed upon the excavation line 24. The wall is either vertical, or it may incline slightly away from the viewer or inspector 14, as is common in the art. Preferably wall 12 terminates at its top in an external cap unit 22 secured with concrete adhesive.

A stone fill region 28 is created adjacent the inner face of wall 12. Region 28 provides an adequate drainage environment for one or more conventional PVC drain pipes 31 (FIG. 1) 30. Proper drainage is necessary to prevent excessive hydrostatic wall pressure. During construction, as the wall height increases and successive layers of geogrids are installed, a reinforced and compacted backfill zone 34 is preferably established between region 28 and the original excavation line 24. Undisturbed earth bounded by original excavation line 24 is represented generally be reference numeral 38. The backfill zone includes a small front portion 34B which eventually supports a finished grade that may eventually be trimmed with grass turf.

Periodically, according to known standards in the art, sections of geogrid are established between adjacent wall blocks 20. FIG. 1 illustrates three vertically spaced apart geogrid segments 19, 19A and 19B constructed in accordance with this invention. Each of the latter sections is buried during completion of the wall. Once the construction illustrated in FIG. 1 is established, the length 17 of the pertinent geogrid sections must be measured. This measurement is enabled through the structure to be hereinafter described.

Figure 2:
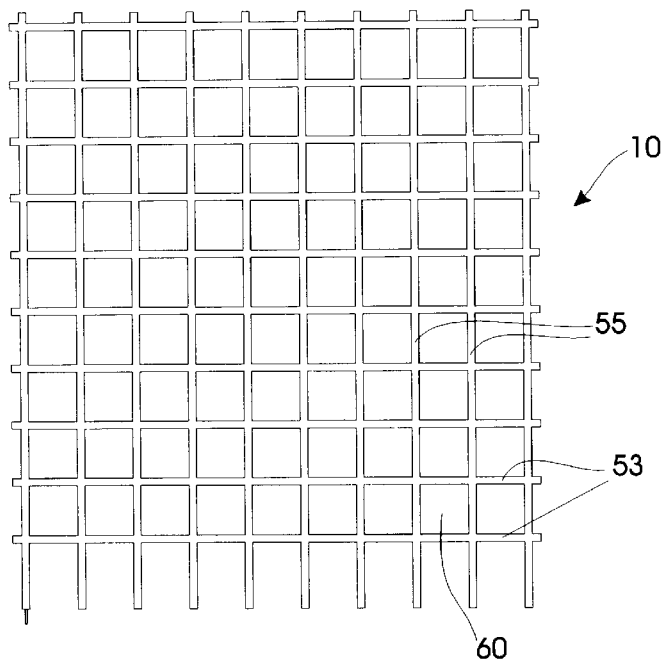
FIG. 2 is an enlarged, fragmentary, top plan view of a preferred geogrid.
Figure 3:
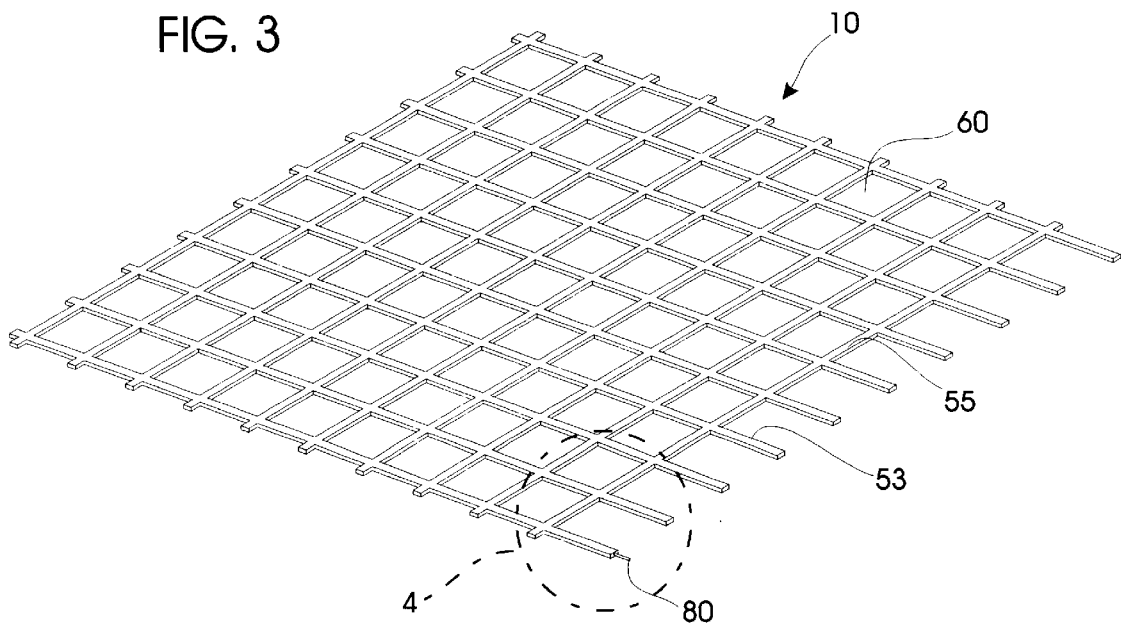
FIG. 3 is an enlarged fragmentary, isometric view of a preferred geogrid.
Figure 4:
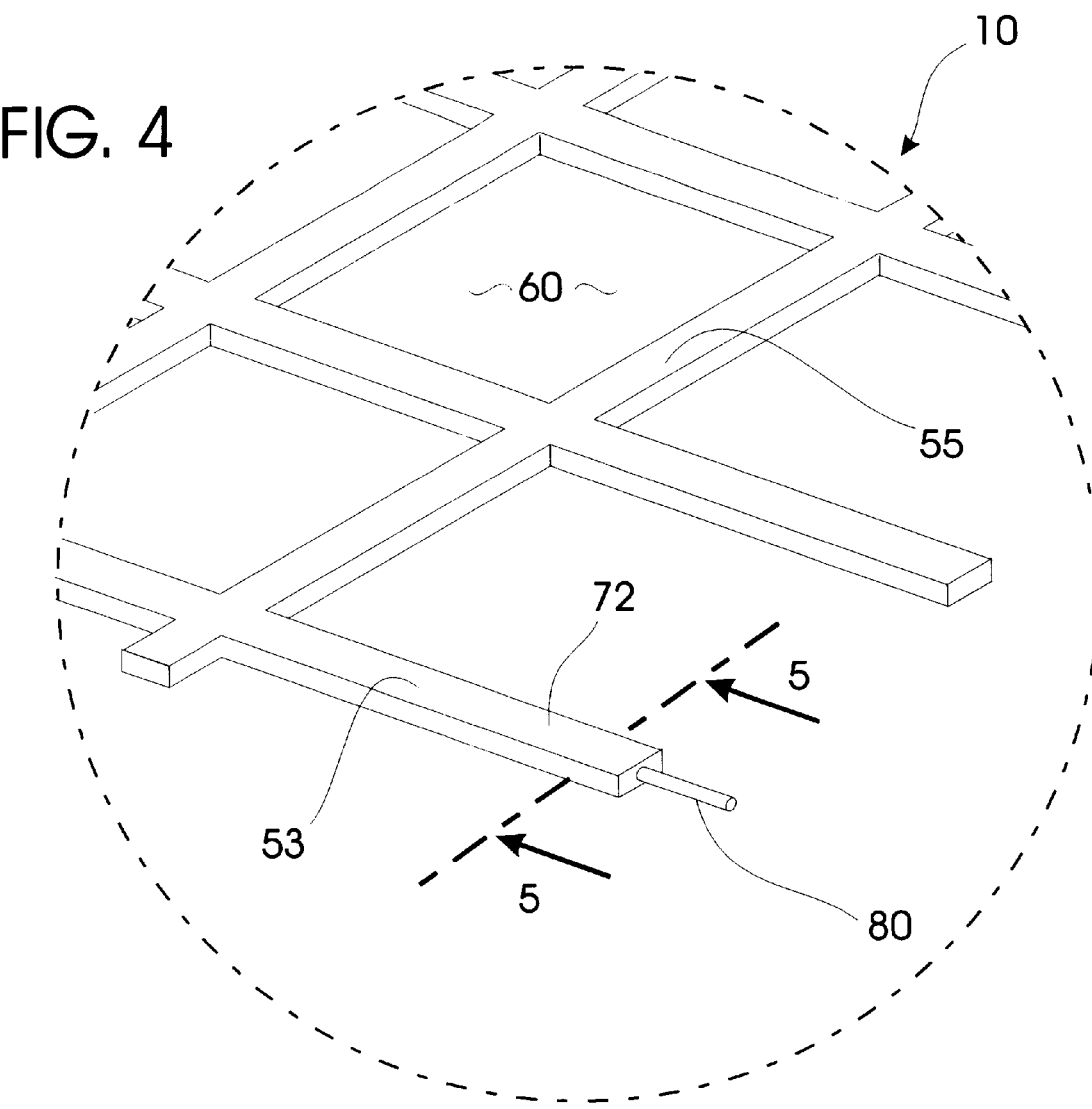
FIG. 4 is a greatly enlarged, fragmentary, isometric view of circled region 4 in FIG. 3.

With emphasis now on FIGS. 2–4, my new geogrid 10 is grid-like in form. Its body comprises a plurality of spaced apart, elongated spans 53, preferably of synthetic polymer material. Spans 53 are the major stress bearing members, and are normally laid generally perpendicularly to the wall 12 (FIG. 1). Spans 53 periodically intersect similar transverse spans 55, with voids 60 defined between intersecting spans. The spans 55 bear less stress than spans 53 and need not be as thick or as strong.

Figure 5:
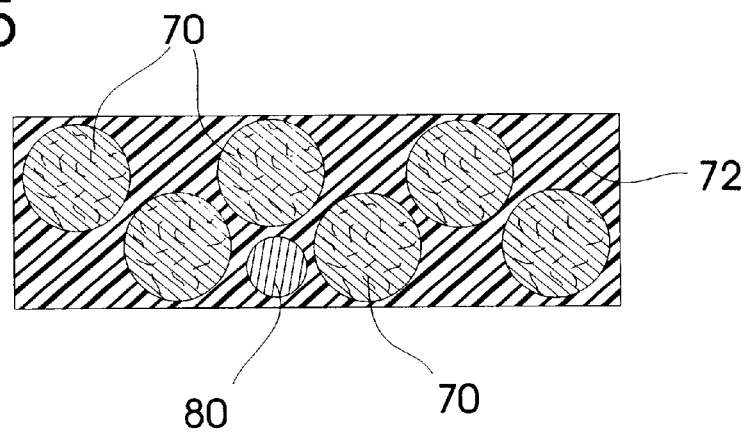
FIG. 5 is an enlarged fragmentary, sectional view taken generally along line 5—5 in FIG. 4.

As best seen in FIGS. 4 and 5, the preferred cross section of each span 53, 55 is of generally rectangular dimensions. Each span comprises a plurality of elongated, filamentary strands 70. Strands 70 may comprise polymer yarns, or synthetic plastics. During construction of the geogrid these reinforcing strands 70 are captivated within the generally rectangular body 72 of the span, which is preferably formed of a resilient polymer. Of course, geogrids can be made of different materials, and the spans may omit the fiber reinforcement strands 70.

All embodiments of my geogrid comprise a test line 80 (FIGS. 4, 5) that is preferably captivated within the resilient mass of a geogrid body member 72. In all forms of the invention this test line 80 is sensed to determine geogrid length. In the preferred embodiment line 80 comprises an electrically conductive wire, and electrical pulses are applied to the line and return echoes are sensed. The diameter of the preferred electrical conductor is preferably between one half to one tenth the diameter of the typical geogrid reinforcement strand 70.

In a first alternative embodiment line 80 comprises an acoustically transmissive media to transmit acoustic energy, and sonic measurement techniques of return echoes are employed. In a second alternative embodiment line 80 comprises a fiber optic conductor for transmitting light pulses. Return echoes are sensed for length measurements. In all cases the length of line 80 is related to the length of the geogrid span 17 (FIG. 1) in question. Thus measurement of the length of test line 80 will correspond to the length of the installed geogrid.

In the best mode of the invention hand unit 16 previously described generates an electrical pulse that is applied to an exposed end of test line 80 through a probe lead 18 of known fixed length. Alternatively the unit 16 may apply light or sound as described hereinafter. Preferably, geogrid length is electrically determined by measuring the timing interval between the application of an electrical pulse and the sensing of a pulse echo or return. The time difference is determined, and correlated to the overall travel path. However, while it is preferred to measure timing differences between applied and return pulses, other length dependent electrical characteristics of the geogrid conductor span, such as frequency resonance or pulse amplitude attenuation, could be employed to electrically determine ultimate geogrid length according to the teachings of this invention. It will be further understood that other embodiments of my invention contemplate that either acoustic or light energy may be applied to the test line 80.

Figure 6:
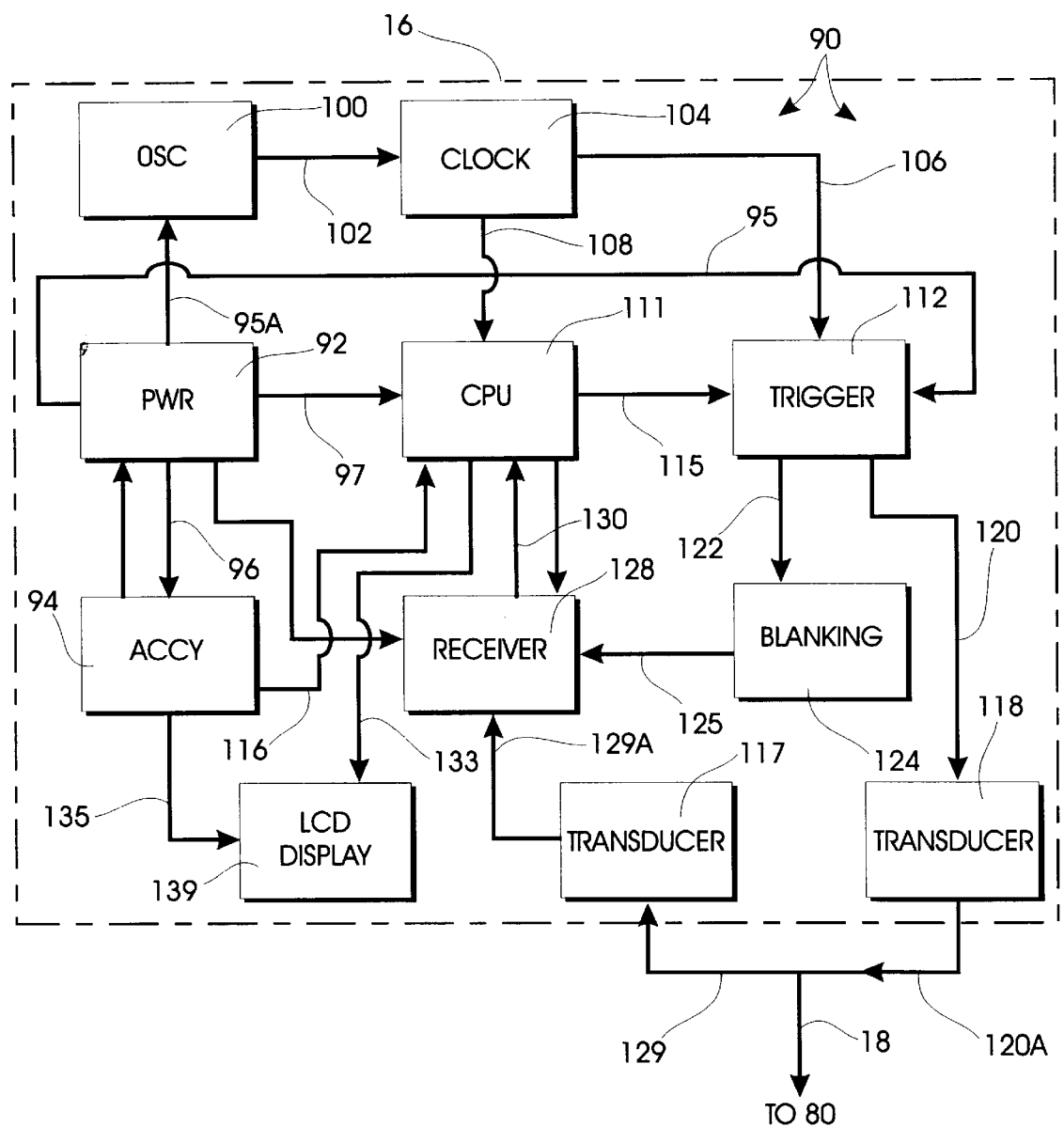
FIG. 6 is a generalized block diagram of the geogrid length determination electronics; and, FIG. 7 is a flow chart showing the presently-preferred software.

Turning to FIG. 6, a preferred circuit for the hardware comprising hand held unit 16 is generally designated by the reference numeral 90. In circuit 90 power is derived from a battery-powered module 92 controlled by circuit 94 that comprises various electronic accessories and control hardware, including an on/of switch. With circuit 94 actuated, power is outputted from lines 95A and 95–97. Oscillator 100 responds on line 102 driving clock 104. The divided down clock output appears on lines 106 and 108. CPU 111 calculates the timing interval between the application of a signal to the geogrid under test and the detection of a return echo, accommodating the fixed length of the probe line in the transmission path. In the best mode a high frequency electrical pulse is developed and applied to the geogrid under test. Alternatively light pulses or sonic (i.e., acoustic) techniques can be used. CPU 111 activates a trigger circuit 112 from line 115 in response to a "measure" command generated by a suitable switch (not shown) in accessory module 94, that communicates with CPU 111 onlines 116.

The pulse output on line 122 activates blanker 124 to turn off receiver 128 on line 125. Trigger 112 also applies its output pulses via lines 120, 120A to the probe lead 18 that is attached to the geogrid during measurements. (In the preferred mode transducer 118 is unnecessary). The receiver will quickly recover from blanking, and a return echo will eventually be detected by receiver 128 on lines 129, 129A. (In the preferred mode transducer 118 is unnecessary). CPU 111 will be notified of return echo detection via line 130, and the software (FIG. 7) will be executed. Line 133 from CPU 111 comprises a number of bus lines that activate LCD display 139. Depending upon the selection enabled by accessory circuit 94 via line 135, the time delay or the actual measured length of the geogrid under tests will be displayed.

In the alternative embodiments transducers 117 and 118 are active. For sonic measuring, for example, transducer 118 is activated by trigger 112 on line 120 to produce an acoustic output on lines 120A and 18. Sonic vibrations that are pulse generated are appropriately delivered to the geogrid under test. Return acoustic pulses are delivered via lines 18, 129 to transducer 117 that produces a suitable electrical pulse transmitted to receiver 128 on line 129A. The transducers thus transform pulses between electrical and acoustic forms.

In an alternative light sensing embodiment, transducer 117 transforms electrical pulses appearing on line 120 to light pulses outputted on lines 18 and 120A which, in this embodiment, comprise fiber optic conductors. Transducer 117 senses light via fiber optic lines 18 and 129 and outputs corresponding electrical pulses on line 129A to activate the receiver. The rest of the circuitry functions substantially similarly to the preferred embodiment described in detail already.

Figure 7:
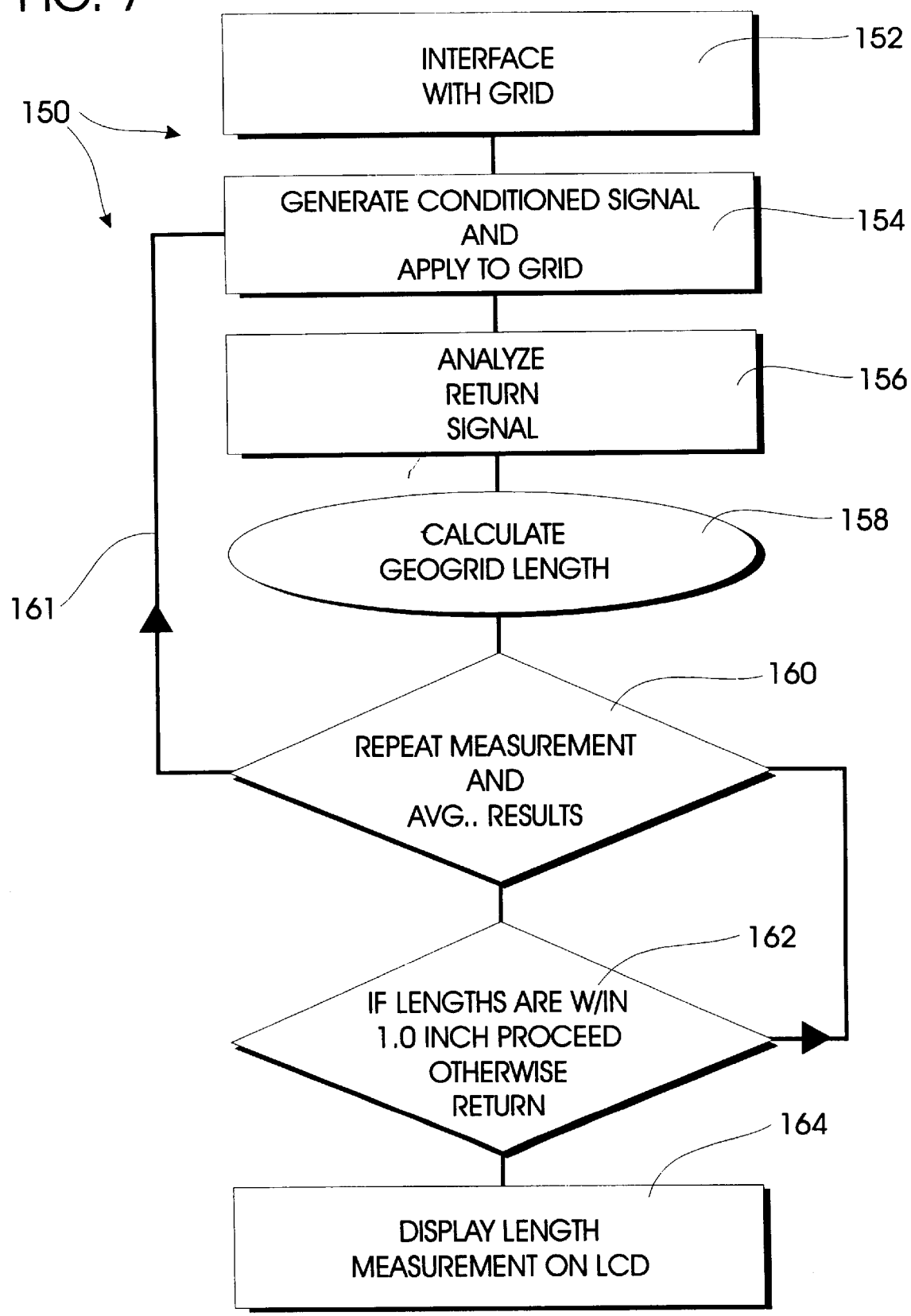

Suitable software that is executable by CPU 111 (FIG. 6) is shown in FIG. 7. Routine 150 starts with step 152 wherein the probe line 18 (FIG. 1) is first attached to an exposed end of line 80 (FIG. 3). Of course, depending upon the embodiment of the invention, the probe may be thought of as sensing and/or applying pulses comprising either electrical, acoustic, or light energy. Step 154 essentially instructs CPU 111 to activate trigger 112. The timing interval measurement step 156 occurs when receiver 128 (FIG. 6) pulses CPU 111 on line 130 (FIG. 6). Grid length, which is directly related to the analyzed timing interval, is calculated in step 158.

In step 160 the hardware of FIG. 6 is instructed to repeat the pulse application and echo detection process a predetermined number of times, and the repeated results are averaged. Line 161 initiates the repeat sequence. Of course the actual code compensates for the length of the probe connection 18. Substep 162 in effect checks for errors, which can occur, for example, when the battery is weak or the probe is improperly connected, etc. Finally, in step 164, a digital display of the length is displayed on LCD 139 (FIG. 6).

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method of measuring the length of a concealed or buried geogrid that reinforces retaining walls or earthen formations, said method comprising the steps of:

providing a geogrid comprising a grid-like body of a predetermined length and width comprising a first plurality of elongated spans and a second plurality of elongated, generally transverse spans;

providing a test line in at least one of said spans of said first plurality substantially coextensive with geogrid length;

generating a signal;

applying said signal to said test line so that the signal travels within the line and reflects back to return an echo;

sensing return echoes on said test line; and, determining the length of said geogrid in response to said sensing step.

2. The method as defined in claim 1 wherein the time difference between said applying and said sensing steps is computed, and said determining step comprises the further step of correlating said length to said time difference.

3. The method as defined in claim 1 further comprising the steps of:

determining the time at which said applying step occurs;

determining the time at which said echo occurs;

determining the time difference between the applied pulse and the echo; and, correlating the time difference to the length of said geogrid.

4. The method as defined in claim 3 wherein said generating, applying, sensing and determining steps are repeated a predetermined number of times and the results are averaged.

5. The method as defined in claim 1 wherein the applying step is accomplished with a probe line of predetermined length, and said determining step includes the further step of compensating for the length of said probe line.

6. The method as defined in claim 1 wherein the test line in said providing step is an electrical conductor and the signal in said generating step comprises an electrical pulse.

7. The method as defined in claim 1 wherein the test line in said providing step is an acoustic conductor and the signal in said generating step comprises a sonic pulse.

8. The method as defined in claim 1 wherein the test line in said providing step is a fiber-optic conductor and the signal in said generating step comprises light energy.

9. A geogrid for reinforcing retaining walls and earthen formations, said geogrid comprising:

a grid-like body of a predetermined length and width comprising a first plurality of elongated spans and a second plurality of elongated, transverse spans that intersect said first plurality of spans with a plurality of voids formed between said first and second pluralities of intersecting spans;

at least one elongated test line formed in at least one of said spans of said first plurality and coextensive therewith, whereby the length of said geogrid is electrically determinable by applying a signal to said test line at a predetermined time so that the signal travels within the line and reflects back to return an echo at a later time and the length of said geogrid is determined from the time difference between signal application and detection of said echo.

10. The geogrid as defined in claim 9 wherein the test line is an electrical conductor.

11. The geogrid as defined in claim 9 wherein the test line is an acoustic conductor.

12. The geogrid as defined in claim 9 wherein the test line is a fiber-optic conductor.

13. Apparatus for determining compliance with geogrid construction specifications, said apparatus comprising:

- a geogrid for reinforcing retaining walls or earthen formations, said geogrid comprising a grid-like body of a predetermined length and width comprising first plurality of elongated spans and a second plurality of elongated, transverse spans that intersect said first plurality of spans;
- a test line disposed in at least one of said spans of said first plurality coextensive with the length of the geogrid; and,
- means for sampling said test line to determine the length of said geogrid, wherein said means for sampling comprises means for applying energy to said test line, means for detecting a return echo caused by said energy means for determining the time difference between the initial application of energy and the return echo, and means for correlating said time difference to the length of said test line and thus said geogrid.

14. Apparatus as defined in claim 13 further comprising means for repeating and averaging the results.

15. Apparatus as defined in claim 13 wherein the means for applying comprises a probe wire of a predetermined length, and said means for sampling comprises means for compensating for the length of said probe wire.

16. Apparatus as defined in claim 13 wherein the test line is an electrical conductor.

17. Apparatus as defined in claim 13 wherein the test line is an acoustic conductor.

18. Apparatus as defined in claim 13 wherein the test line is a fiber-optic conductor.

* * * * *